(12) United States Patent
Shilts

(10) Patent No.: US 8,302,986 B1
(45) Date of Patent: Nov. 6, 2012

(54) AQUATIC STORAGE TRAILER AND CARRIER

(76) Inventor: Delbert R. Shilts, Frankfort, MI (US)

( * ) Notice: Subject to any disclaimer, the term of this patent is extended or adjusted under 35 U.S.C. 154(b) by 20 days.

(21) Appl. No.: 13/084,644

(22) Filed: Apr. 12, 2011

(51) Int. Cl.
*B60P 3/10* (2006.01)

(52) U.S. Cl. .................................................. 280/414.1

(58) Field of Classification Search .............. 280/414.1, 280/414.3; 114/249
See application file for complete search history.

(56) References Cited

U.S. PATENT DOCUMENTS

| | | | |
|---|---|---|---|
| 3,684,139 A | | 8/1972 | Johnson |
| 3,970,203 A | * | 7/1976 | Watson, Jr. .................... 414/538 |
| 4,221,420 A | * | 9/1980 | Vencill et al. .................... 410/24 |
| 4,469,346 A | * | 9/1984 | Low ............................ 280/414.1 |
| 4,880,250 A | * | 11/1989 | Cravens et al. ............ 280/414.1 |
| 5,119,752 A | | 6/1992 | Doherty |
| 5,152,656 A | * | 10/1992 | Potter ............................ 414/462 |
| D355,882 S | | 2/1995 | Aubut et al. |
| 5,435,261 A | | 7/1995 | Androus |
| 5,791,280 A | | 8/1998 | Egan et al. |
| 5,899,656 A | * | 5/1999 | Rahe et al. .................... 414/537 |
| 6,203,264 B1 | * | 3/2001 | Combs, Sr. .................... 414/483 |
| 6,217,053 B1 | * | 4/2001 | Forsythe et al. ........... 280/414.3 |
| 7,581,506 B2 | | 9/2009 | Whitney |

* cited by examiner

*Primary Examiner* — Tony Winner

(57) ABSTRACT

An aquatic storage trailer and carrier provide storage and transport of items by a personal watercraft and land transport of both the aquatic trailer and personal watercraft. The aquatic trailer and carrier include a container having a lid portion hingedly coupled to a hull portion. The hull portion and the lid portion form an interior space configured for item storage. A tow arm has a U-shaped portion having free ends coupled to the container. An extension portion of the tow arm is configured for coupling to a watercraft to tow the container on a water surface using the watercraft. A carrier is provided having a watercraft cradle configured for supporting the watercraft. The carrier also has a pair of cradle arms selectively couplable to the container to support the container on the carrier during transport.

19 Claims, 4 Drawing Sheets

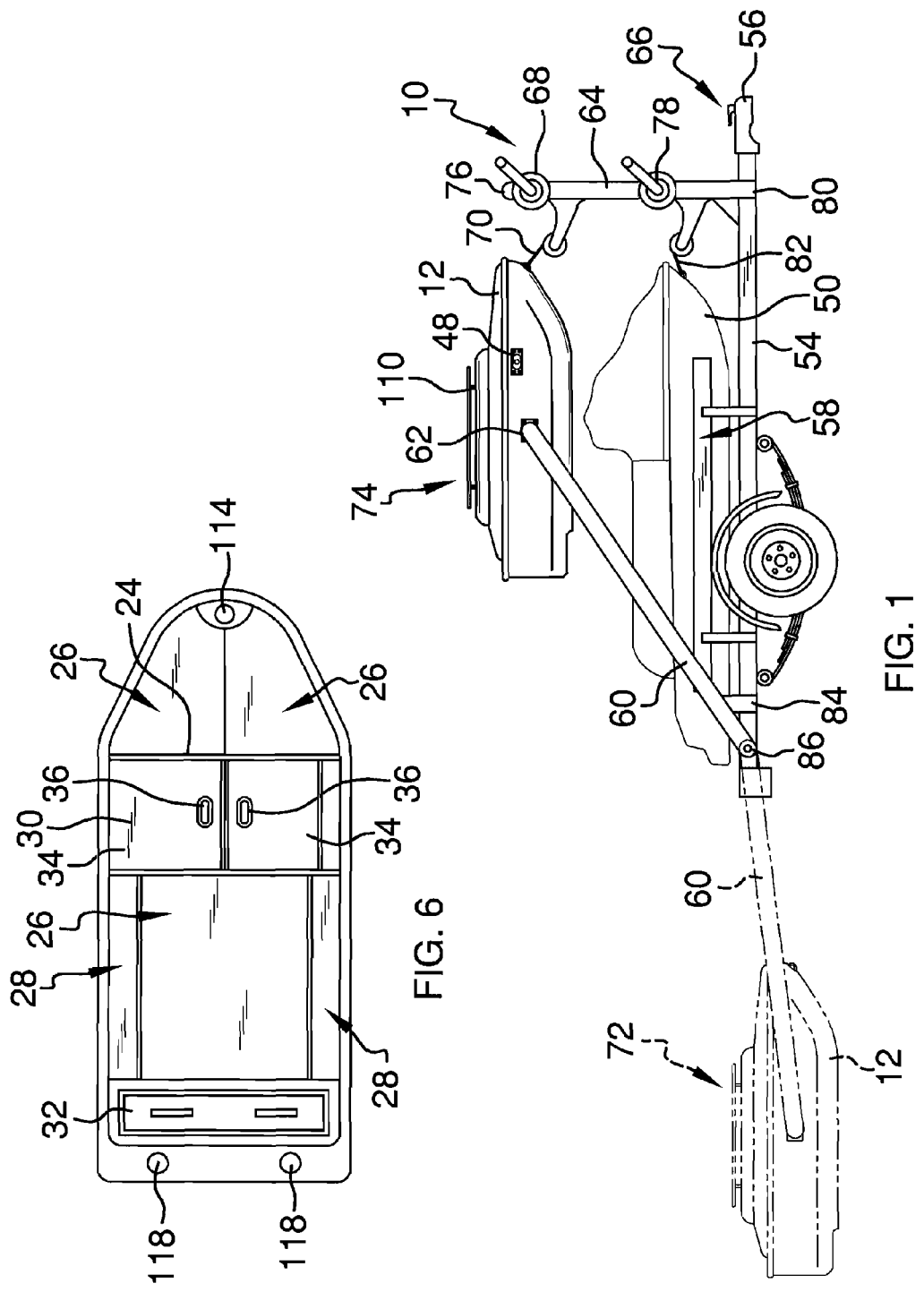

AQUATIC STORAGE TRAILER AND CARRIER

BACKGROUND OF THE DISCLOSURE

Field of the Disclosure

The disclosure relates to aquatic cargo devices and more particularly pertains to a new aquatic cargo device for providing storage and transport of items by a personal watercraft and land transport of both the aquatic trailer and personal watercraft.

SUMMARY OF THE DISCLOSURE

An embodiment of the disclosure meets the needs presented above by generally comprising a container having a lid portion hingedly coupled to a hull portion. The hull portion and the lid portion form an interior space configured for item storage. A tow arm has a U-shaped portion having free ends coupled to the container. An extension portion of the tow arm is configured for coupling to a watercraft to tow the container on a water surface using the watercraft. A carrier is provided having a watercraft cradle configured for supporting the watercraft. The carrier also has a pair of cradle arms selectively couplable to the container to support the container on the carrier during transport.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is side view of a aquatic storage trailer and carrier according to an embodiment of the disclosure.

FIG. 6 is a top view of the hull portion of the container of an embodiment of the disclosure.

DESCRIPTION OF THE PREFERRED EMBODIMENT

Figure 3:
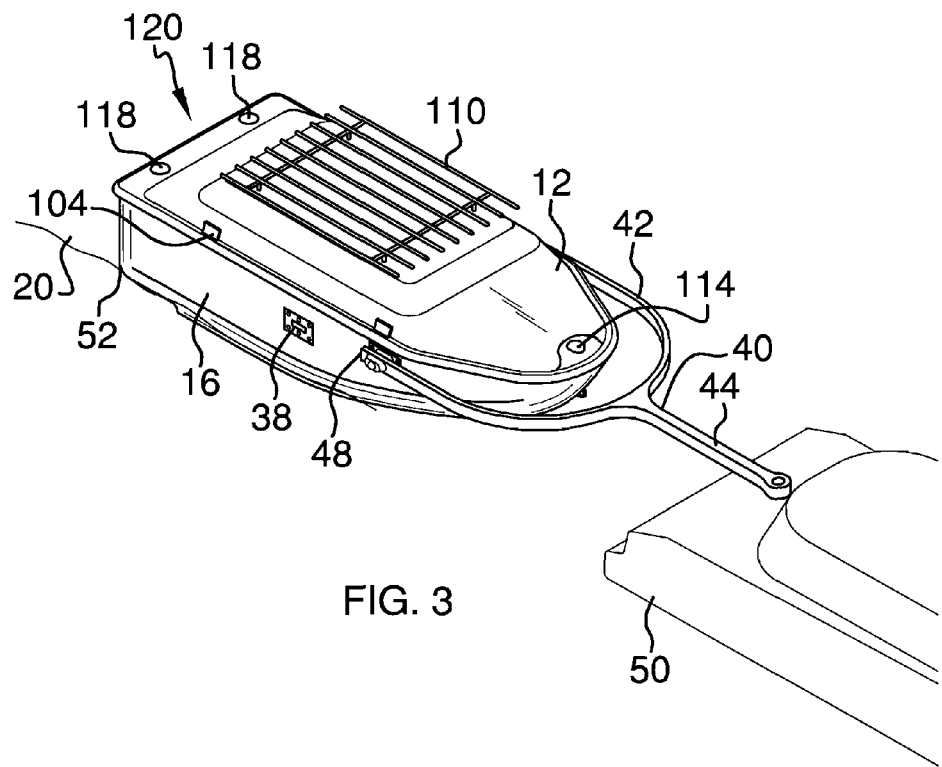
FIG. 3 is a top front side perspective view of an embodiment of the disclosure.
Figure 2:
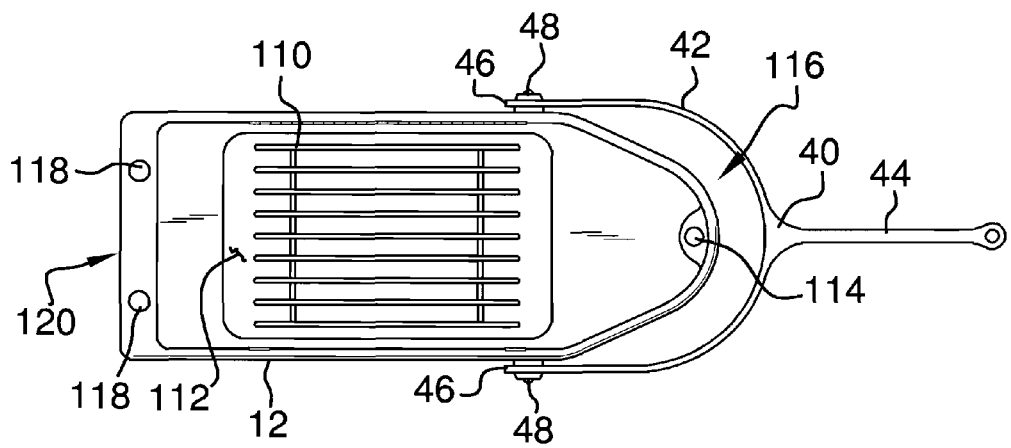
FIG. 2 is a top view of an embodiment of the disclosure.
Figure 5:
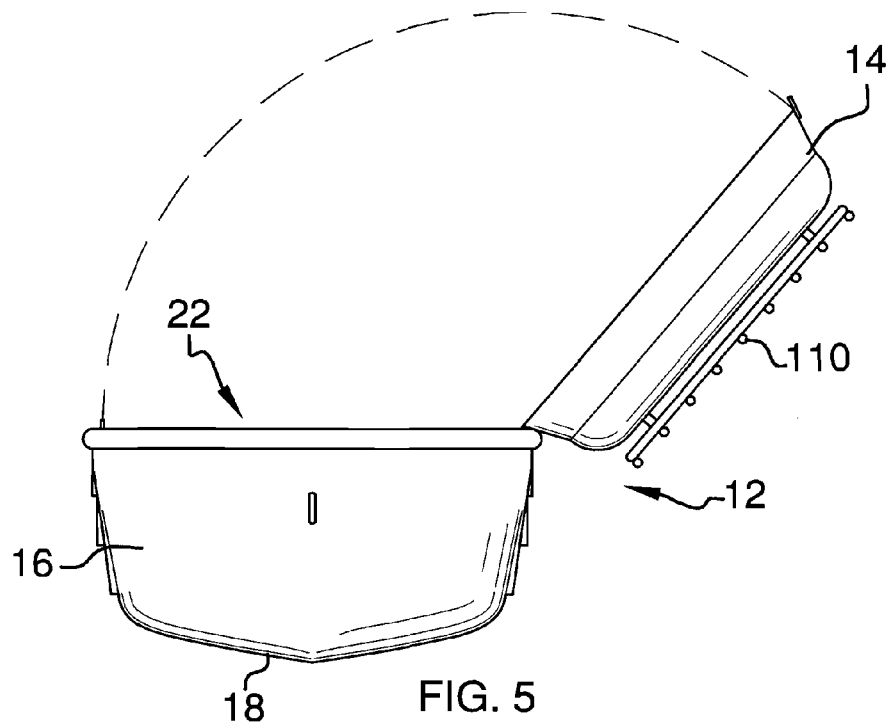
FIG. 5 is a front view of an embodiment of the disclosure.
Figure 4:
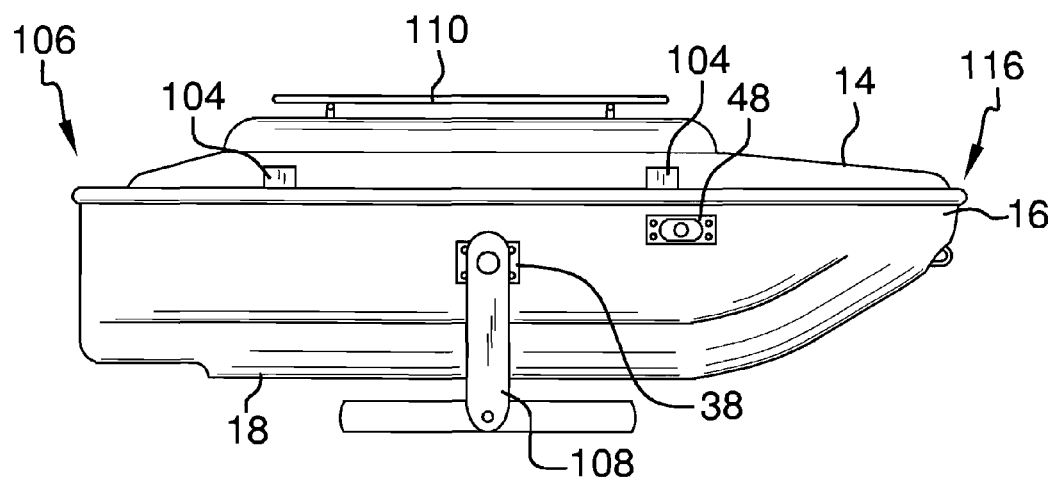
FIG. 4 is a side view of an embodiment of the disclosure.
Figure 7:
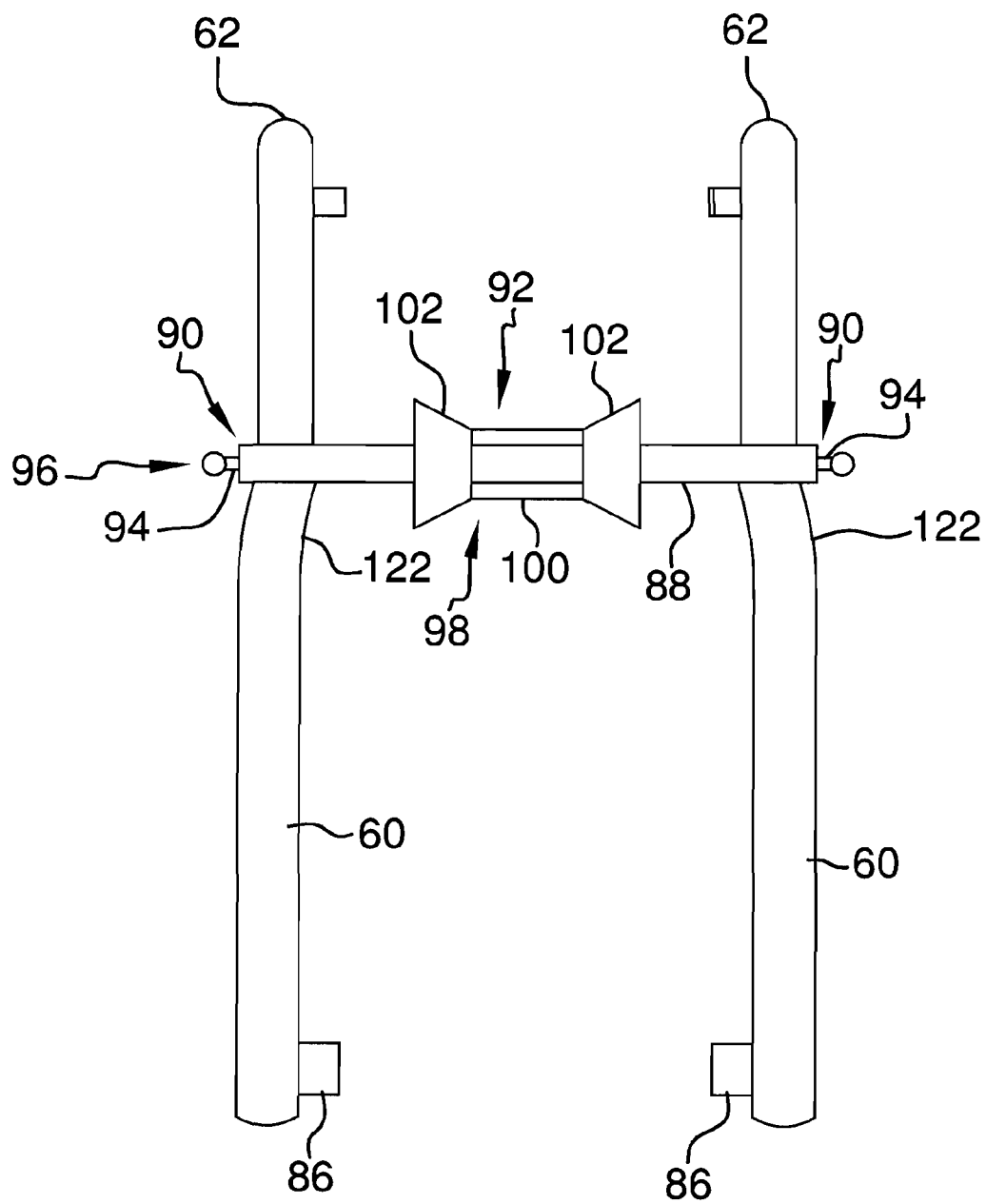
FIG. 7 is a top view of an embodiment of the disclosure.

With reference now to the drawings, and in particular to FIGS. 1 through 7 thereof, a new aquatic cargo device embodying the principles and concepts of an embodiment of the disclosure and generally designated by the reference numeral 10 will be described.

As best illustrated in FIGS. 1 through 7, the aquatic storage trailer and carrier 10 generally comprises a container 12 having a lid portion 14 hingedly coupled to a hull portion 16. The hull portion 16 has a curved bottom surface 18 configured to displace water 20 whereby the container 12 will float on the water 20. The hull portion 16 and the lid portion 14 form an interior space 22 configured for item storage. The container 12 also has a plurality of interior walls 24 dividing the interior space 22 into a plurality of interior compartments 26. The interior compartments 26 may include specialized compartments such as a pair of support leg storage compartments 28, an insulated cooler compartment 30, a grill storage compartment 32. Each interior compartment 26 may have a lid 34 and a handle 36.

A tow arm 40 has a U-shaped portion 42 and an extension portion 44 extending from the U-shaped portion 42. The U-shaped portion 42 has free ends 46 removably coupled to the container 12 towing mounts 48 positioned on the hull portion 16. The extension portion 44 of the tow arm 40 is configured for coupling to a personal watercraft 50. Thus, the container 12 is towed on a water surface 52 by the watercraft 50.

A carrier 54 having a hitch attachment 56 is provided for transport on land. The carrier 54 has a watercraft cradle 58 configured for supporting the watercraft 50. A pair of side mounts 38 is coupled to the hull portion 16 of the container 12. A pair of cradle arms 60 is selectively couplable to the side mounts 38 to support the container 12 on the carrier 54. A distal end 62 of each the cradle arm 60 relative to the carrier 54 is pivotally coupled to the side mounts 38. The pair of cradle arms 60 is also pivotably coupled to the carrier 54.

A winch post 64 is coupled to the carrier 54. The winch post 64 is positioned proximate a front 66 of the carrier 54. A container winch 68 is coupled to the carrier 54 on the winch post 64. The container winch 68 has a line 70 coupled to the container 12 for pivoting the container 12 and the cradle arms 60 from a loading position 72 into a storage position 74 over the watercraft 50 on the watercraft cradle 58. The cradle arms 60 may also include an offset portion 122 so that the distal ends 62 are more closely spaced than a width of the carrier 54 for enhanced stability while the carrier 54 is loaded and moving. The container winch 68 is positioned on the winch post 64 proximate a top 76 of the winch post 64. A watercraft winch 78 is also coupled to the winch post 64. The watercraft winch 78 is positioned between a bottom 80 of the winch post 64 and the container winch 68. The watercraft winch 78 includes a cable 82 configured for coupling to the watercraft 50 to hold the watercraft 50 on the watercraft cradle 58.

A pair of arm stops 84 is coupled to the carrier 54. The arm stops 84 are positioned to abut the cradle arms 60 when the cradle arms 60 are fully pivoted into the storage position 74. A pair of biasing members 86 is coupled to the cradle arms 60 and the carrier 54 such that the cradle arms 60 are urged into the loading position 74. Thus, loosening the container winch 68 will permit movement of the cradle arms 60 into the loading position 72 from the storage position 74. A cross arm 88 is rigidly coupled to and extends between the cradle arms 60 so that the cradle arms 60 pivot in unison. Opposing ends 90 of the cross arm 88 are adjustably securable to the cradle arms 60. Threaded connectors 94 or an equivalent structure may be used to engage the cradle arms 60 such that the cross arm 88 are rigidly secured to the cradle arms 60 at a selectable position 96 along a length of the cradle arms 60.

A pad 92 may be coupled to a medial portion 98 of the cross arm 88. The pad 92 is positionable by adjusting the position of the cross arm 88 to abut the bottom surface 18 of the hull portion 16 of the container 12 when the container 12 is coupled to the cradle arms 60 and the cradle arms 60 are pivoted into the storage position 74. The pad 92 may include a tubular middle portion 100 and a pair of flared outer portions 102 to facilitate holding the watercraft 50 stably on the carrier 54.

A latch assembly 104 is coupled to the container 12 whereby the lid portion 14 is selectively securable to the hull portion 16 of the container 12 to hold the container 12 in a closed position 106. A pair of support legs 108 may be provided. Each support leg 108 is removably couplable to an associated one of the side mounts 38 to hold the container 12 in an elevated stationary position when not being transported on the carrier 54 or towed by the watercraft 50. A rack 110 is coupled to an upper surface 112 of the lid portion 14 of the container 12. An umbrella mount 114 may be coupled to the container 12 proximate a front 116 of the container 12. A pair of spaced grill mounts 118 may also be coupled to the container 12 proximate a rear 120 of the container 12 to facilitate attachment of a grill to the container 12. Thus, the container 12 provides a multitude of desirable uses associated with outdoor recreation.

In use, the watercraft 50 and container 12 are transported on the carrier 54. The container 12 is attached to the watercraft 50 using the tow arm 40 to transport various items held in the interior compartments 26. The container 12 may be detached from the watercraft 50 and supported by support legs 108 while holding an umbrella and grill using the umbrella mount 114 and grill mounts 118. After use, the container 12 is reloaded onto the carrier by attaching the cradle arms 60 to the side mounts 38 and the line 70 to the container 12. The container winch 68 is manipulated to pivot the container 12 and cradle arms 60 into the storage position 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An aquatic cargo trailer assembly comprising:
    a container having a lid portion hingedly coupled to a hull portion, said hull portion and said lid portion forming an interior space configured for item storage;
    a tow arm having a U-shaped portion and an extension portion extending from said U-shaped portion, said U-shaped portion having free ends coupled to said container, said extension portion of said tow arm being configured for being coupled to a watercraft whereby said container is towed on a water surface by the watercraft; and
    a carrier having a watercraft cradle configured for supporting the watercraft, said transport carrier having a pair of cradle arms selectively couplable to said container to support said container on said carrier.

2. The assembly of claim 1, further including a rack coupled to an upper surface of said lid portion of said container.

3. The assembly of claim 1, further including an umbrella mount coupled to said container proximate a front of said container.

4. The assembly of claim 1, further including a pair of spaced grill mounts coupled to said container, said grill mounts being positioned proximate a rear of said container.

5. The assembly of claim 1, further including a pair of side mounts coupled to said hull portion of said container, said cradle arms being coupled to said side mounts.

6. The assembly of claim 5, further comprising:
    said cradle arms being pivotably coupled to said carrier;
    a distal end of each said cradle arm relative to said carrier being pivotably coupled to said hull portion of said container; and
    a container winch coupled to said carrier, said container winch having a line coupled to said container for pivoting said container and said cradle arms from a loading position into a storage position.

7. The assembly of claim 6, further including a pair of arm stops coupled to said carrier, said arm stops being positioned to abut said cradle arms when said cradle arms are fully pivoted into said storage position.

8. The assembly of claim 6, further including a cross arm rigidly coupled to and extending between said cradle arms whereby said cradle arms pivot in unison.

9. The assembly of claim 8, further including a pad coupled to a medial portion of said cross arm, said pad being positioned to abut a bottom surface of said hull portion of said container when said container is coupled to said cradle arms and said cradle arms are pivoted into said storage position.

10. The assembly of claim 9, wherein said pad includes a tubular middle portion and a pair of flared outer portions.

11. The assembly of claim 8, wherein opposing ends of said cross arm are adjustably securable to said cradle arms such that said cross arm is rigidly couplable to said cross arms at a selectable position along a length of said cradle arms.

12. The assembly of claim 6, further comprising:
    a winch post coupled to said carrier, said winch post being positioned proximate a front of said carrier;
    said container winch being positioned on said winch post proximate a top of said winch post; and
    a watercraft winch coupled to said winch post, said watercraft winch being positioned between a bottom of said winch post and said container winch, said watercraft winch including a cable configured for coupling to the watercraft to hold the watercraft on said watercraft cradle.

13. The assembly of claim 6, further including biasing members coupled to said cradle arms and said carrier whereby said cradle arms are urged into said loading position.

14. The assembly of claim 5, further including a pair of support legs, each support leg being coupled to an associated one of said side mounts.

15. The assembly of claim 14, further including said container having a plurality of interior compartments, said interior compartments including a support leg storage compartment.

16. The assembly of claim 1, further including a latch assembly coupled to said container whereby said lid portion is selectively securable to said hull portion of said container to hold said container in a closed position.

17. The assembly of claim 1, further including said container having a plurality of interior walls dividing said interior space into a plurality of interior compartments.

18. The assembly of claim 17, wherein said interior compartments include an insulated cooler compartment.

19. An aquatic cargo trailer assembly comprising:
a container having a lid portion hingedly coupled to a hull portion, said hull portion and said lid portion forming an interior space configured for item storage, said container having a plurality of interior walls dividing said interior space into a plurality of interior compartments, said interior compartments including a support leg storage compartment, wherein said interior compartments include an insulated cooler compartment;
a pair of side mounts coupled to said hull portion of said container;
a tow arm having a U-shaped portion and an extension portion extending from said U-shaped portion, said U-shaped portion having free ends coupled to said container, said extension portion of said tow arm being configured for being coupled to a watercraft whereby said container is towed on a water surface by the watercraft;
a carrier having a watercraft cradle configured for supporting the watercraft;
a pair of cradle arms selectively couplable to said side mounts to support said container on said carrier, said pair of cradle arms being pivotably coupled to said carrier, a distal end of each said cradle arm relative to said carrier being pivotably coupled to said side mounts;
a winch post coupled to said carrier, said winch post being positioned proximate a front of said carrier;
a container winch coupled to said carrier, said container winch having a line coupled to said container for pivoting said container and said cradle arms from a loading position into a storage position, said container winch being positioned on said winch post proximate a top of said winch post;
a watercraft winch coupled to said winch post, said watercraft winch being positioned between a bottom of said winch post and said container winch, said watercraft winch including a cable configured for coupling to the watercraft to hold the watercraft on said watercraft cradle;
a pair of arm stops coupled to said carrier, said arm stops being positioned to abut said cradle arms when said cradle arms are fully pivoted into said storage position;
a pair of biasing members coupled to said cradle arms and said carrier whereby said cradle arms are urged into said loading position;
a cross arm rigidly coupled to and extending between said cradle arms whereby said cradle arms pivot in unison, wherein opposing ends of said cross arm are adjustably securable to said cradle arms such that said cross arm is rigidly couplable to said cross arms at a selectable position along a length of said cradle arms;
a pad coupled to a medial portion of said cross arm, said pad being positioned to abut a bottom surface of said hull portion of said container when said container is coupled to said cradle arms and said cradle arms are pivoted into said storage position, wherein said pad includes a tubular middle portion and a pair of flared outer portions;
a latch assembly coupled to said container whereby said lid portion is selectively securable to said hull portion of said container to hold said container in a closed position;
a pair of support legs, each support leg being removably couplable to an associated one of said side mounts;
a rack coupled to an upper surface of said lid portion of said container;
an umbrella mount coupled to said container proximate a front of said container; and
a pair of spaced grill mounts coupled to said container, said grill mounts being positioned proximate a rear of said container.

* * * * *